(12) United States Patent
Sandrart et al.

(10) Patent No.: US 7,137,590 B2
(45) Date of Patent: Nov. 21, 2006

(54) LUBRICATING INSTALLATION FOR ROCKING POWER TRANSMISSION BOX

(75) Inventors: Thierry Sandrart, Velaux (FR); Lionel Thomassey, Fos sur Mer (FR); Glacomo Orsini, Castellazo Bormida (IT)

(73) Assignees: Eurocopter, Marignane Cedex (FR); Avio S.p.A., Turin (IT)

( * ) Notice: Subject to any disclaimer, the term of this patent is extended or adjusted under 35 U.S.C. 154(b) by 221 days.

(21) Appl. No.: 10/494,767

(22) PCT Filed: Oct. 31, 2002

(86) PCT No.: PCT/FR02/03757

§ 371 (c)(1),
(2), (4) Date: May 5, 2004

(87) PCT Pub. No.: WO03/040593

PCT Pub. Date: May 15, 2003

(65) Prior Publication Data

US 2005/0115770 A1    Jun. 2, 2005

(30) Foreign Application Priority Data

Nov. 7, 2001    (FR) .................................. 01 14392

(51) Int. Cl.
*B64C 27/52*    (2006.01)
*F16H 57/04*    (2006.01)

(52) U.S. Cl. .................................. 244/17.25

(58) Field of Classification Search ............. 244/17.05, 244/12.4, 56, 72, 66, 7 R, 7 C; 184/6.2, 184/11.1–11.5, 103.1, 103.2, 6.4; 476/8–9; 74/417, 594

See application file for complete search history.

(56) References Cited

U.S. PATENT DOCUMENTS 1,443,572 A * 1/1923 Gosline .................. 244/66
1,868,975 A * 7/1932 Hall ........................ 244/66
2,273,129 A   2/1942 Messinger
2,731,282 A   1/1956 McManus et al.
3,075,690 A * 1/1963 Luenberger ............ 415/182.1
3,424,372 A   1/1969 Blattner et al.

(Continued)

FOREIGN PATENT DOCUMENTS

DE    24 11 693    9/1975

(Continued)

*Primary Examiner*—Michael J. Carone
*Assistant Examiner*—John A Radi
(74) *Attorney, Agent, or Firm*—Young & Thompson

(57) ABSTRACT

An installation includes at least a pressurized lubricating circuit for elements housed in the rocking crankcase, each circuit including a radial transfer bearing between two opposite cylindrical journals coaxial about the rocking axis, one fixed journal on a fixed part and one pivoting journal on a pivoting part integral with the pivoting crankcase. Each transfer bearing has two U-shaped annular gaskets facing each other and spaced apart along the rocking axis so as to define between them an annular pressurized liquid lubricant chamber. The annular chamber is supplied with pressurized liquid lubricant by at least a supply duct integrated in the fixed part and whose upstream part is connected to a pressurized lubricant source, and feeds the rocking crankcase with pressurized lubricant through a dispensing duct emerging into the rocking crankcase. The invention is useful for lubricating rocking power transmission boxes for convertible aircraft tilt rotors.

17 Claims, 9 Drawing Sheets

U.S. PATENT DOCUMENTS

| | | | |
|---|---|---|---|
| 3,528,630 A * | 9/1970 | Ferris et al. | 244/12.3 |
| 3,942,387 A * | 3/1976 | Stone et al. | 74/417 |
| 3,995,793 A * | 12/1976 | Wing | 244/7 R |
| 4,426,964 A * | 1/1984 | Umeda et al. | 123/195 A |
| 4,571,157 A * | 2/1986 | Eickmann | 416/158 |
| 4,766,859 A * | 8/1988 | Miyaki et al. | 123/196 W |
| 4,856,273 A * | 8/1989 | Murray | 60/39.08 |
| 4,858,426 A * | 8/1989 | Holcomb | 60/39.08 |
| 5,121,815 A * | 6/1992 | Francois et al. | 184/6.4 |
| 5,239,880 A * | 8/1993 | Hawkins et al. | 74/406 |
| 5,709,357 A * | 1/1998 | von Wilmowsky | 244/7 R |
| 5,788,372 A * | 8/1998 | Jones et al. | 267/136 |
| 6,227,481 B1 * | 5/2001 | Fenny et al. | 244/7 R |
| 6,247,667 B1 * | 6/2001 | Fenny et al. | 244/7 R |
| 6,260,793 B1 | 7/2001 | Balayn et al. | |
| 6,328,004 B1 * | 12/2001 | Rynhart | 123/73 AF |
| 6,467,724 B1 * | 10/2002 | Kuenkler | 244/17.25 |
| 6,607,357 B1 * | 8/2003 | Caramaschi | 416/134 A |
| 6,676,073 B1 * | 1/2004 | Thomassey | 244/7 R |
| 6,691,830 B1 * | 2/2004 | Blanc et al. | 184/6.2 |
| 6,830,215 B1 * | 12/2004 | Sandrart et al. | 244/56 |
| 6,915,983 B1 * | 7/2005 | Thomassey et al. | 244/17.25 |
| 2002/0036119 A1 * | 3/2002 | Blanc et al. | 184/6.2 |
| 2005/0115770 A1 * | 6/2005 | Sandrart et al. | 184/6.2 |

FOREIGN PATENT DOCUMENTS

| | | |
|---|---|---|
| EP | 0 424 341 | 4/1991 |
| FR | 1 544 378 | 10/1968 |
| FR | 2 791 634 | 10/2000 |

* cited by examiner

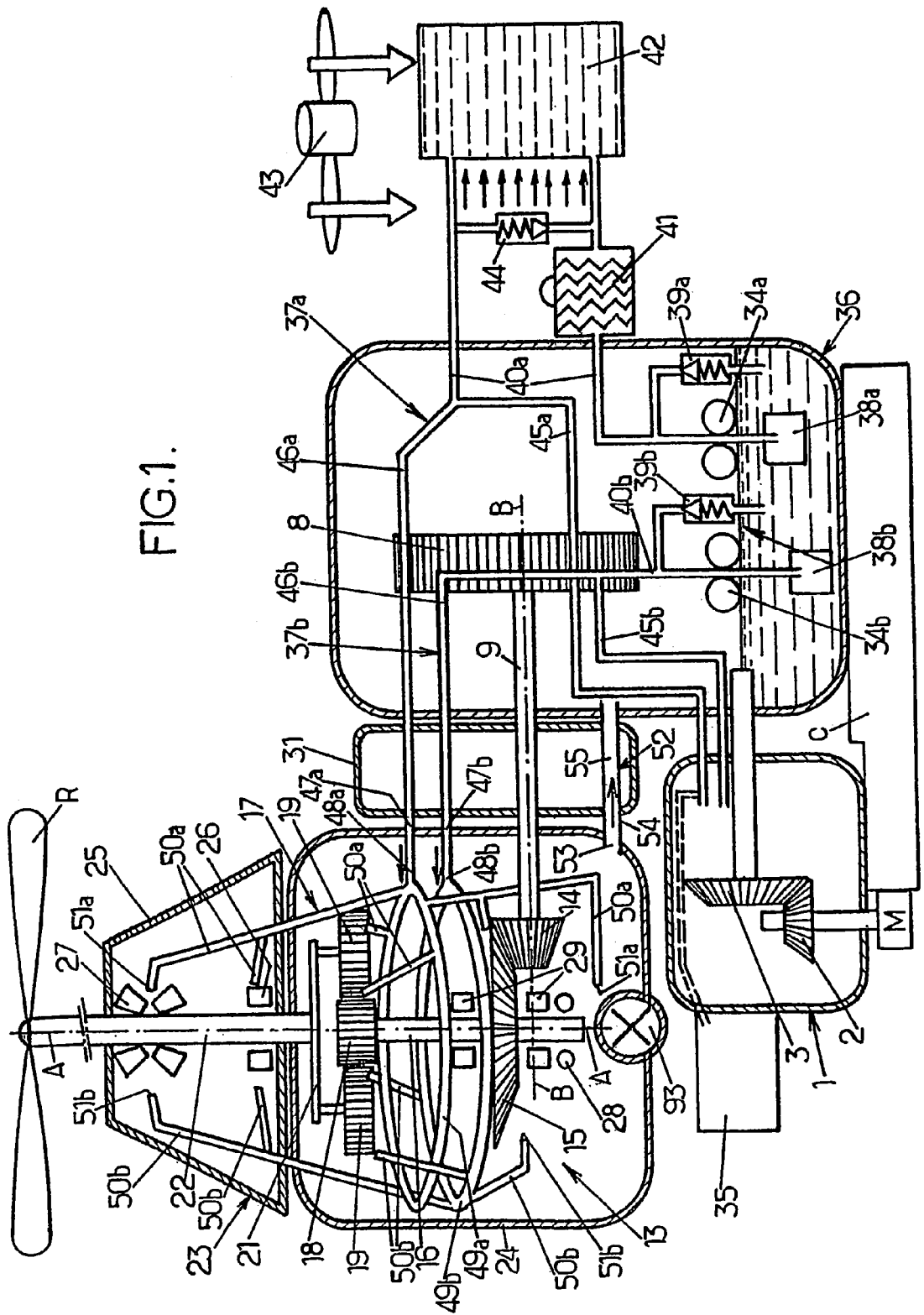

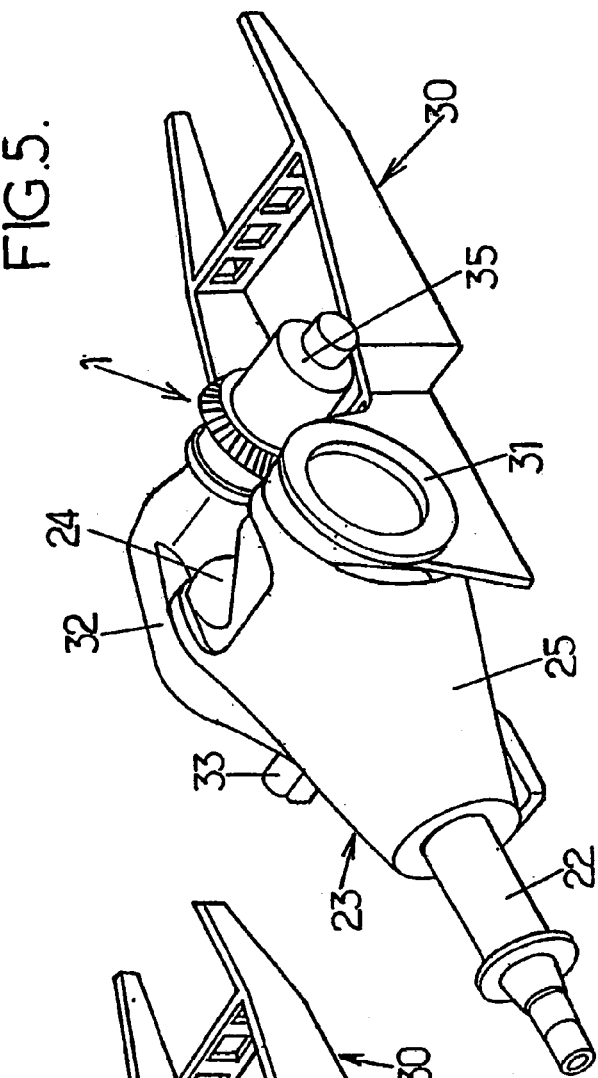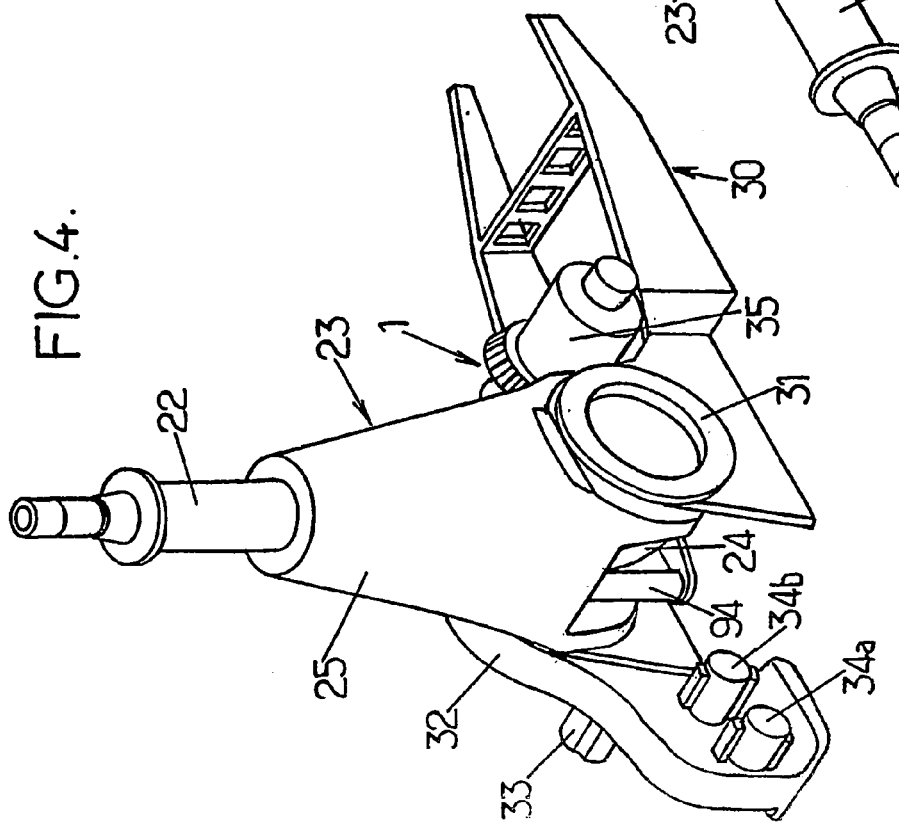

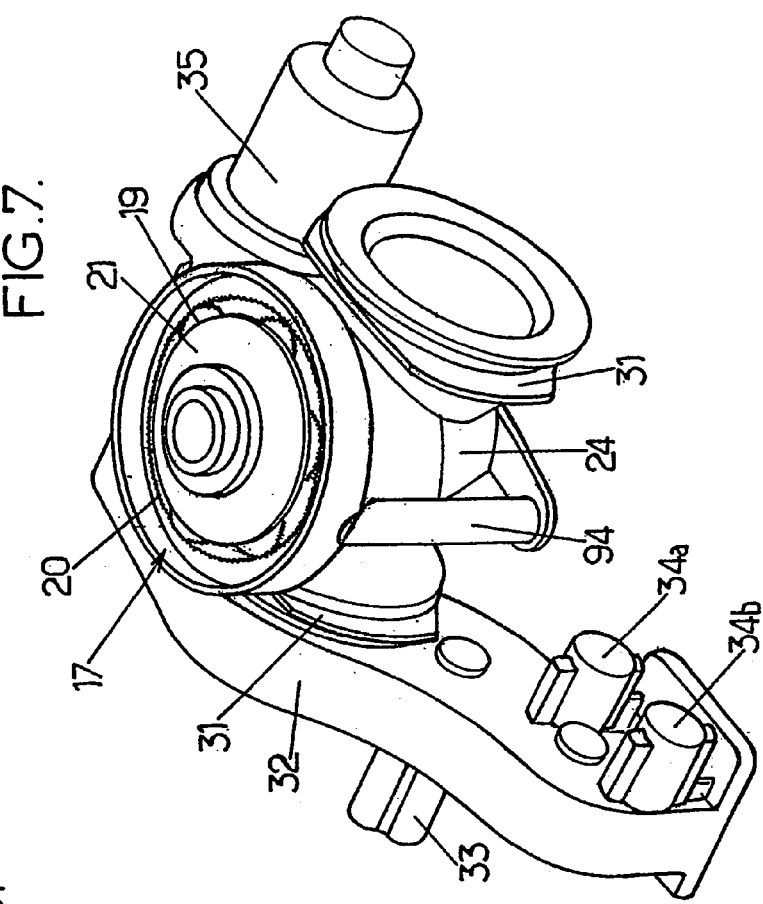
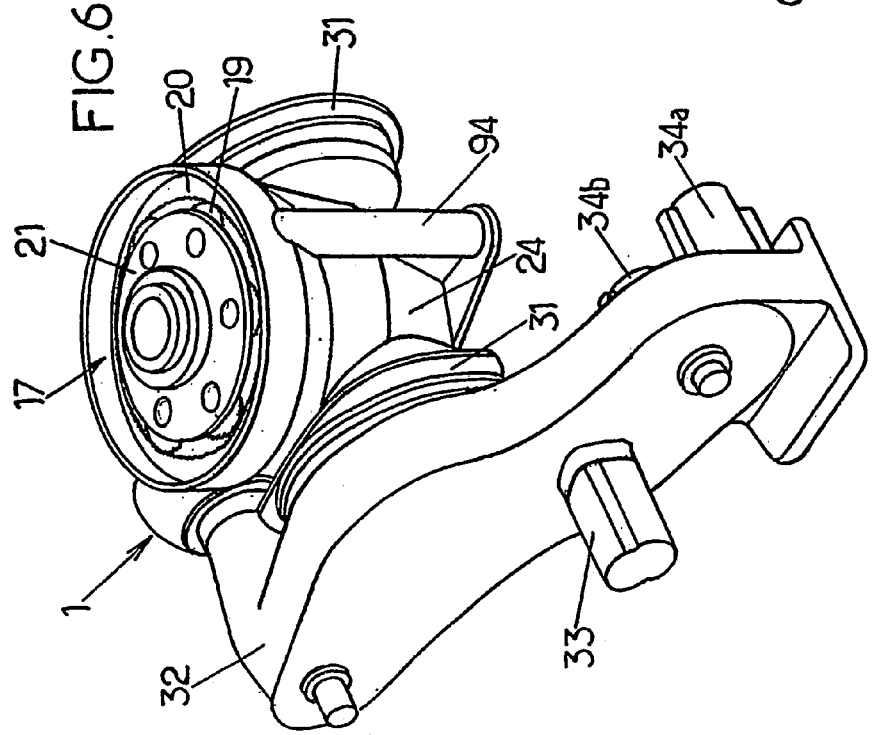

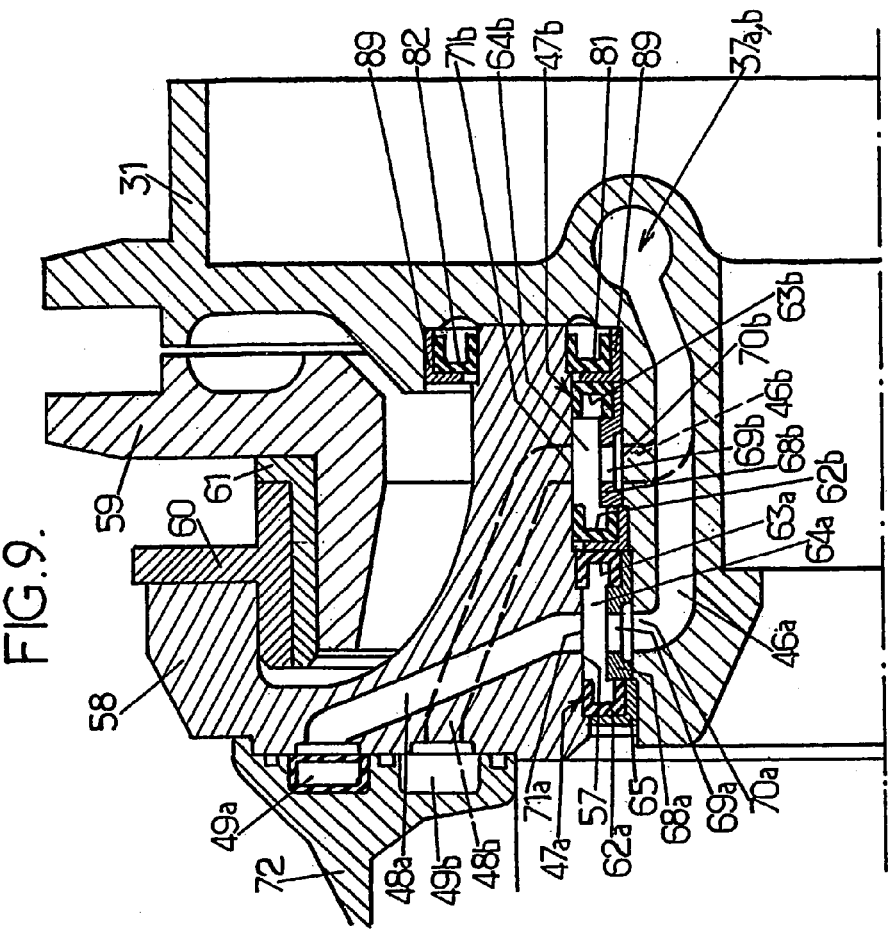
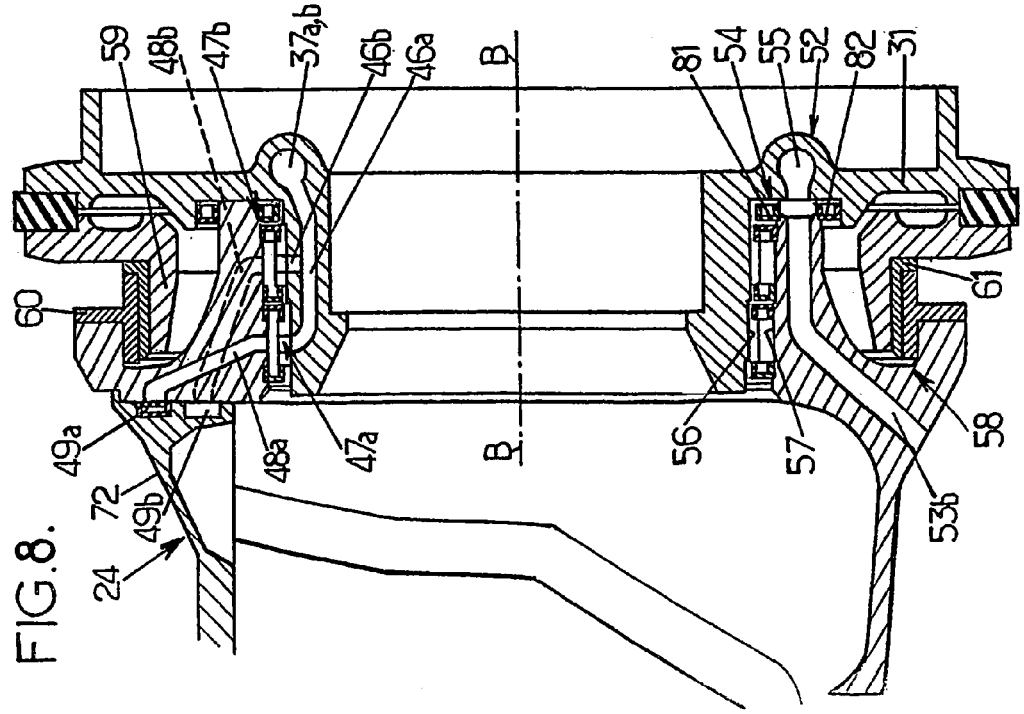

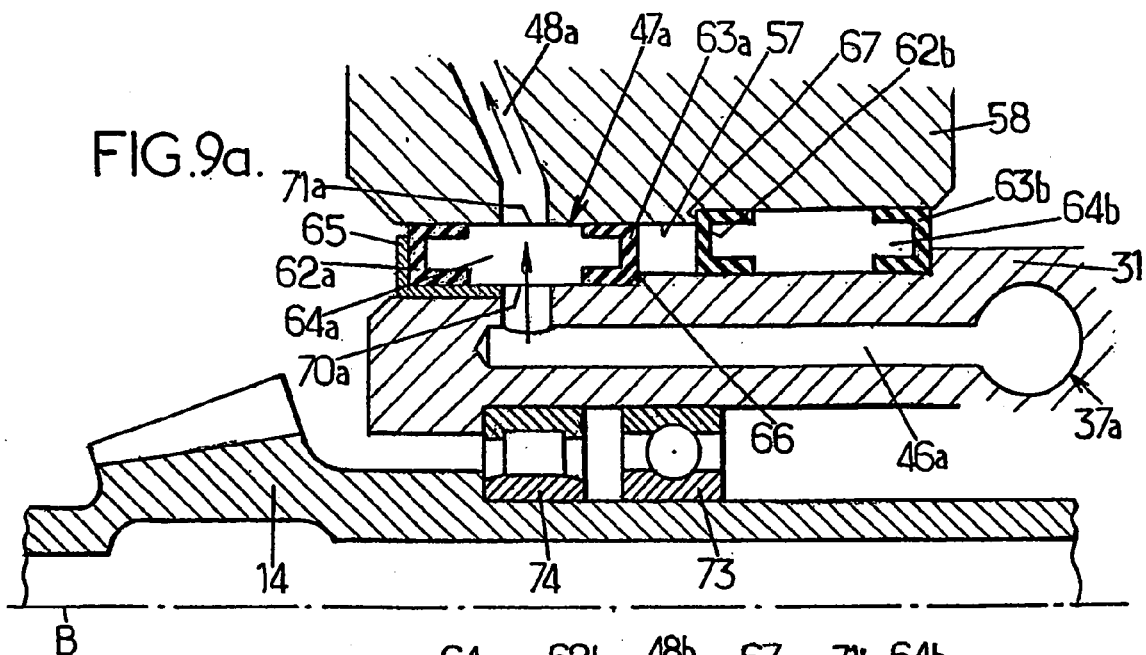
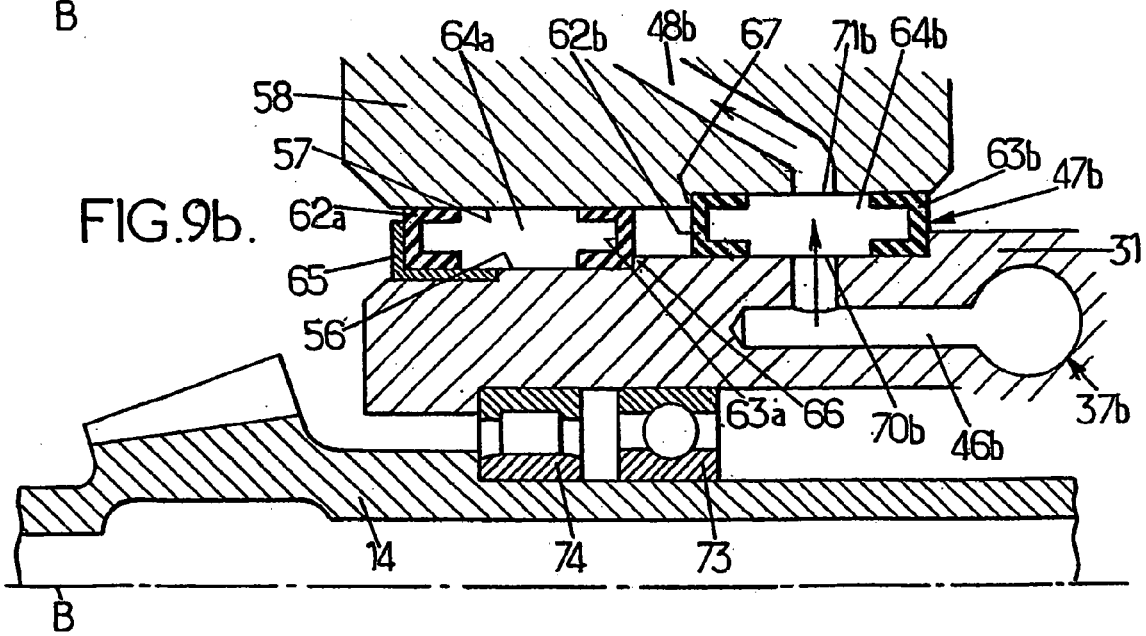
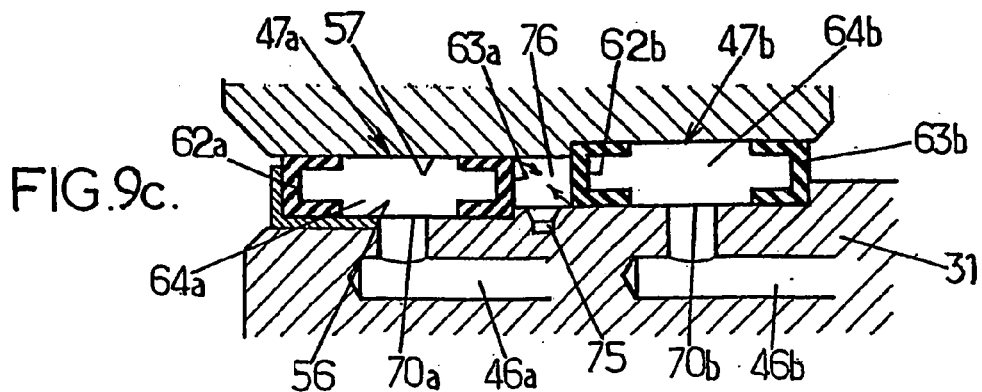

LUBRICATING INSTALLATION FOR ROCKING POWER TRANSMISSION BOX

BACKGROUND OF THE INVENTION

The invention relates to a lubricating circuit for a tilting power transmission box, of the type generally intended to rotate at least one driven assembly about an axis of rotation itself having to be able to swivel, during the rotation of the driven device, about a tilting axis, more or less perpendicular to the axis of rotation of driven device, with said transmission box including a tilting crankcase assembled about the tilting axis on a rigid non-tilting support.

The tilting transmission crankcase can be used, in a nonrestrictive way, as power transmission crankcase to equip aircraft whose system of propulsion is directional, such as dirigibles or aircraft of the convertible type, in which case the rotation of the driven device by the transmission is ensured from at least one rotational power source, or yet again as power transmission box fitted to windmills, in which case the driven device is a rotor spun by the wind, and is actually a driving force for the transmission which drives a receiver, for example, an alternator.

Generally, the tilting power transmission box lubricated by the installation according to the invention may be used in all the directional propulsion or energy generation systems by rotation which require, for their smooth operation, effective lubrication of the transmission system placed in the tilting crankcase, such as driving gears, bearings and/or driving ribs.

In particular, as an application for which a tilting power transmission box equipped with a lubrication installation according to the invention is of great interest to the Applicants, such a transmission box can be used for driving in rotation, from at least one motor-propulsion unit, for example of the turbomotor type, at least one tilting rotor of an aircraft of the type known as convertible, being able to operate in aircraft mode or helicopter mode, and whose rotor drive shaft turns about a tilting axis so as to be able to change from a position in which the rotor functions like a propeller for flight in aircraft mode to a position in which the rotor functions like a helicopter hovering rotor for the helicopter flight mode.

A tilting power transmission box for such a convertible tilting rotor aircraft is described in particular in FR 2 791 319 and FR 2 791 634, to be referred to for more precise on this subject However, note that these two patents describe a convertible tilting rotor aircraft, of a type in which each rotor shaft turns about itself through a reducing assembly in front of respectively one of two power transmissions each comprising also a rear reducing unit, connected to the corresponding front reducing unit and to respectively two engines (turbomotors), each supported by respectively one of the two fixed wings of the aircraft, and with an interconnecting shaft connecting the two transmissions for the rotational driving of the two rotors by either of the two engines, in the event of the other engine failing.

Each rotor shaft, the corresponding power transmission and the corresponding engine are placed in one respectively of two articulated nacelles, each comprising a front part designed to tilt, about the tilting axis, on a fixed part with respect to the aircraft and attached respectively to the two wings of the aircraft, in which are placed the corresponding engine and at least part of the rear reducing unit of the corresponding transmission, of which the front reducing unit, engineered like a main helicopter transmission box and the corresponding rotor shaft are housed in the front tilting part of the nacelle, and are assembled to tilt with this front part compared to the rear fixed part of the nacelle and the corresponding fixed wing.

In this application, and with this architecture, for each power transmission, it is essential that many of the parts of the front reducing unit, housed in the tilting crankcase, are constantly suitably lubricated, when the rotor turns, to ensure the safe flight of the aircraft.

SUMMARY OF THE INVENTION

The purpose of the invention is to offer a lubrication installation for such a tilting power transmission box, meeting the above requirements and simultaneously making it possible to feed into a restricted volume restricts a sufficient amount of liquid lubricant circulating from the non-tilting rigid support towards a tilting crankcase, and, in return, from the latter towards the rigid support, via channels that are integrated advantageously into the swiveling assembly means of the casing on the non-tilting rigid support, while allowing the monitoring of any lubricant leakage at the interface between the rigid support and the tilting crankcase, combined with relatively easy maintenance of the installation.

To this end, the lubrication installation according to the invention, for a tilting power transmission box of the type presented above, is characterized in that it includes at least one pressurized lubricating circuit for at least one assembly to be lubricated, such as driving gear, bearing, journal and/or splined system placed in the tilting crankcase, with the aforementioned lubricating circuit comprising a radial transfer stage for liquid lubricant under pressure, between two facing cylindrical journals more or less coaxial with the tilting axis, and of which at least one is fixed, mounted on a fixed part integral with said non-tilting support, and the other is a swiveling journal, mounted on a swiveling part integral with the casing swivel, said radial transfer bearing comprising two annular seals having a prone U-section, with the concave face of each turned towards the other and at a distance from one another according to the tilting axis, so as to delimit between the two joints and the two journals a ring of pressurized liquid lubricant, whose pressure applies each of the two side lips of each seal radially towards the inside or outside against respectively one of the two journals with, the aforementioned annular chamber being on the one hand, supplied with liquid lubricant under pressure through an inlet orifice, emerging in the fixed journal between the two seals, and with the downstream end of at least one supply duct and whose upstream end is connected to at least one pressurized lubricating source, and, in addition, feeding the tilting crankcase with pressurized lubricating liquid through an outlet orifice emerging in the swiveling journal between two seals, and at the upstream end, of at least one distribution pipe extending into the swiveling part and emerging in the tilting crankcase.

This embodiment offers the advantage of comprising, for each lubricating circuit, a radial self-sealing transfer journal, since the pressure of the liquid lubricant in the annular chamber between the corresponding U-shaped seals ensures the radial sealing by the application of the side lips of the seals against the two facing cylindrical journals and of allowing the integration of such a radial transfer journal between a fixed part and a swiveling part which can be those at the level on which one of the two journals is fitted through which the tilting crankcase is assembled to swivel on the fixed support, or between the fixed and swiveling parts of which at least one is directly integral respectively with a fixed part and a swiveling part at the level where this swiveling journal is mounted.

Advantageously, to ensure a efficient lubricant transfer flow over the entire angular swiveling journal of the tilting casing with respect to the fixed support, at least one of the inlet and outlet ports opens into a half circle opening centered on the swiveling axis arranged between the two seals in the corresponding fixed or swiveling journal, with an underlying angle at the center corresponding more or less to the swiveling angle of said tilting crankcase. Moreover, to avoid any increase in the volume of the radial transfer annular chamber journal, which would interfere with its operation, each of the two radial transfer journal seals is retained end-wise between the two journals and against the pressure represented by said annular chamber by a radial shoulder arranged on one of the two journals or by a shouldered ring attached to one of the two journals, preferably the fixed journal.

Advantageously moreover, for the recycling of the liquid lubricant used in the tilting crankcase, the installation also includes a draining circuit, ensuring liquid lubricant return from the tilting crankcase to the fixed part through a radial journal of the liquid lubricant between two radial faces, with respect to the facing tilting axis and of which one face is swiveling on the swiveling part and the other is fixed, arranged on said fixed part, with at least one draining channel, arranged within said swiveling part, emerging in a facial half circle opening centered on the tilting axis and arranged in said swiveling radial face, opposite a drain opening emerging in said fixed radial face, to convey the liquid lubricant to a tank which may thus be integral with the non-tilting support, and in which liquid lubricant can be drawn off for return to at least one installation lubricating circuit, towards the tilting crankcase.

To ensure good radial tightness at the facial transfer journal of the drain circuit, the corresponding facial opening advantageously extends into said radial face swiveling between two other annular seals, more or less coaxial about said tilting axis and located radially one outside the other inside said facial opening, while each of the two other seals have a prone U shaped transversal cross-section with the concave side turned towards said fixed part, and mounted between two more or less coaxial cylindrical journals about the tilting axis and of which one is a swiveling journal arranged on said swiveling part, and the other a fixed journal arranged on said fixed part, so that each other seal, with said fixed part, forms a radial annular sealing chamber communicating between the two radial faces, with the facial opening and the drain opening, and filled with lubricant liquid to apply each of the side lips of said other seal radially towards the outside or inside against respectively one of said swiveling or fixed cylindrical journals.

The installation may then advantageously comprise at least one leak detector, sensitive to the presence of liquid lubricant in the volume formed between a seal associated with the facial transfer journal of the drain circuit and a seal on the radial transfer journal of a lubricating circuit, the two seals being mounted between the same cylindrical journals, with the leak detector on these two seals being in particular a pressure sensor placed preferably in a portion of the fixed journal between these two seals.

To ensure efficient tilting crankcase draining, in particular in the two end swiveling positions that it may assume with respect to the non-swiveling support, the drain circuit may include a first drain channel, emerging downstream into said facial opening, and, upstream, into the bottom of said tilting crankcase in which the liquid lubricant is collected by gravity in at least a first position of said tilting crankcase about the tilting axis, and a second drain channel, emerging into said facial opening by its downstream end and channeling pressurized liquid lubricant through at least one pressurization stage for the lubricant collected in at least one part of said tilting crankcase, in at least a second position of the tilting crankcase about the tilting axis.

In a first embodiment, the device pressurizing the liquid lubricant collected in the tilting crankcase can be a drain pump, driven in a part of said tilting crankcase in which liquid lubricant is collected in at least said second position of said tilting crankcase about said tilting axis, said drain pump feeding said second drain channel.

However, in another embodiment, the device pressurizing the liquid lubricant can be an Archimedean screw as described in FR 0012154, to which the reader will refer for more details on this subject, and in which the Archimedean screw is driven in rotation in a chute extending inside and along a wall of said tilting crankcase, said chute being drilled with holes to collect the liquid lubricant at various levels in said tilting crankcase, in at least said second position of the latter about the fixed tilting axis, said Archimedean screw feeding the second drain channel of the installation drain circuit specific to the invention.

As an alternative, two drain pumps may drive the tilting crankcase in which these two pumps are arranged so that each of them pumps respectively the liquid lubricant collected in one of two portions of the tilting crankcase, when the latter is in respectively on or the other of the two extreme swiveling positions about the tilting axis.

To ensure high reliability, the installation according to the invention advantageously includes two lubricating circuits, whose main circuit and emergency circuit, like their radial transfer journals, have much the same radius about the tilting axis, are offset with respect to one another about the tilting axis, and in a circumferential direction about the tilting axis for their inlet and outlet openings and, if necessary, their half circle opening, and the draining of the lubricant is ensured by a drain circuit common to both lubricating circuits.

Advantageously in this case, the installation can comprise at least one leak detector, sensitive to the presence of liquid lubricant in the volume delimited between the radial transfer journals of both lubricating circuits, when these radial transfer journals are offset end-wise between the same cylindrical fixed and swiveling journals, which is advantageously the case, because it makes it possible to use the same fixed and swiveling parts for both lubricating circuits, and thus also the sole drain circuit.

In this way, an independent lubrication installation is obtained so that the supply pipes, integrated into the fixed part or for each of the lubricating circuits is or are supplied from a liquid lubricant tank in which is immersed at least one lubrication pump for each lubricating circuit.

In the aforementioned preferential application for the lubrication of a transmission with two reducing units, one tilting, to drive a tilting rotor on a convertible aircraft, it is advantageous for each lubrication pump to be driven by a pinion of the first reducing unit placed at least partly in non-tilting crankcase not integral with said support, said first reducing unit meshing, through a pinion mounted to rotate about said tilting axis, with a second reducing unit placed in said tilting crankcase swiveling with the latter.

To ensure effective lubrication in the tilting crankcase, each lubricating circuit, in the latter, at least one annular distribution channel, more or less centered on said axis of rotation of the driven unit, and connected to said annular chamber of the corresponding radial transfer journal through said distribution line.

This annular distribution channel is advantageously arranged in a more or less transversal diaphragm with respect to the tilting crankcase and supporting at least one guide of at least one shaft carrying at least one pinion of second reducing unit and/or of said unit driven in rotation, each annular distribution channel feeding lubricating liquid to the lubrication lines ending in lubricant jets directed towards the devices to be lubricated in said tilting crankcase.

The invention also relates to a convertible aircraft, including at least one tilting rotor designed to be driven in rotation about an axis of rotation, itself required to swivel about a tilting axis, through at least one tilting power transmission box including a tilting crankcase mounted about said tilting axis, which is more or less perpendicular to the axis of rotation, on at least one rigid non-tilting support integral with the structure of said aircraft, said casing housing at least one unit to be lubricated, such as pinions, bearings and/or ribbed splines, with the aircraft characterized in that it comprises at least one lubricating installation for at least one said power tilting transmission box and in such a manner that said lubrication installation is an installation according to the invention, as defined above.

BRIEF DESCRIPTION OF THE DRAWINGS

Other advantages and characteristic of the invention will be understood by reference to the description given below, unrestrictedly, of a typical embodiment described in reference to the attached illustrations in which:

FIG. 1 schematically illustrates a power transmission with a tilting crankcase and the associated lubrication installation, for a tilting rotor on a convertible aircraft, FIGS. 4 and 5 are schematic perspective views of the transmission represented with the tilting crankcase respectively in helicopter mode and aircraft mode, FIGS. 6 and 7 are schematic perspective views of the transmission of FIGS. 4 and 5 without the higher part of the crankcase in helicopter mode and the rotor mast as well as some transmission elements housed therein, FIG. 8 is a schematic view, sectional through the tilting axis near the swiveling journal of the crankcase and the lubrication and drain circuits of the installation depicted in FIG. 1, FIG. 9 is a larger scale view of a detail of FIG. 8 at the swiveling journal of the casing and the radial transfer journals of the lubricating circuits, FIGS. 9a and 9b are schematic representations of alternatives of FIG. 9 confined to the main and respectively standby lubricating circuits, FIG. 9c schematically illustrates a leak detection monitoring device between the radial transfer journals of the two lubricating circuits.

DESCRIPTION OF THE PREFERRED EMBODIMENTS

Figure 3:
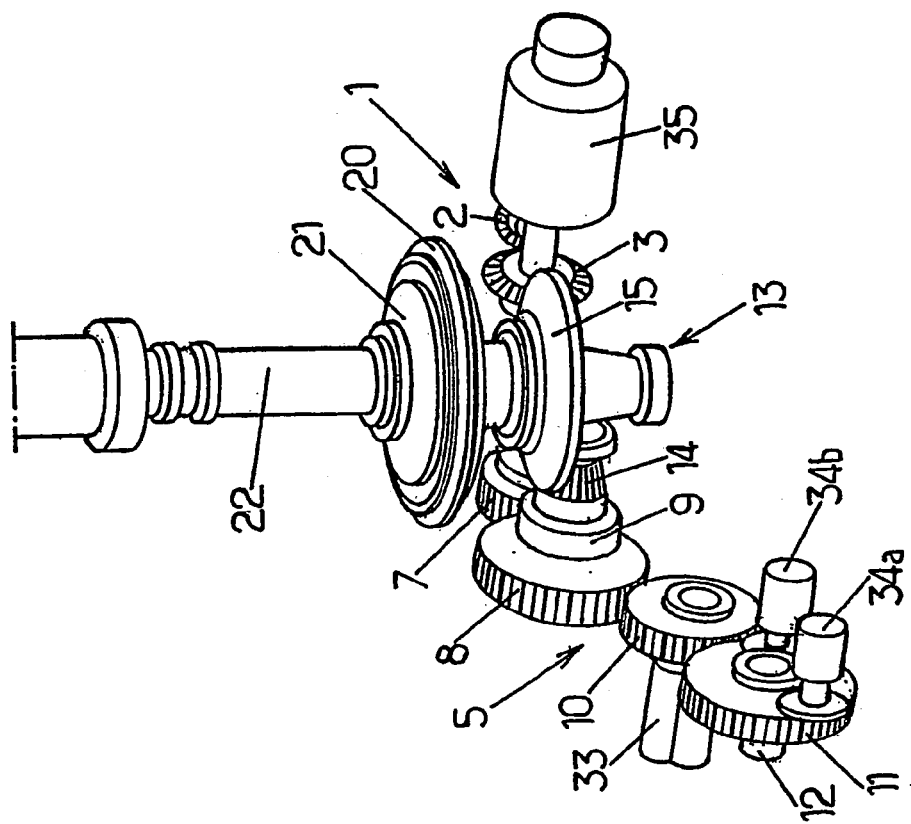
FIGS. 2 and 3 are schematic perspective views of the transmission represented without a crankcase.
Figure 2:
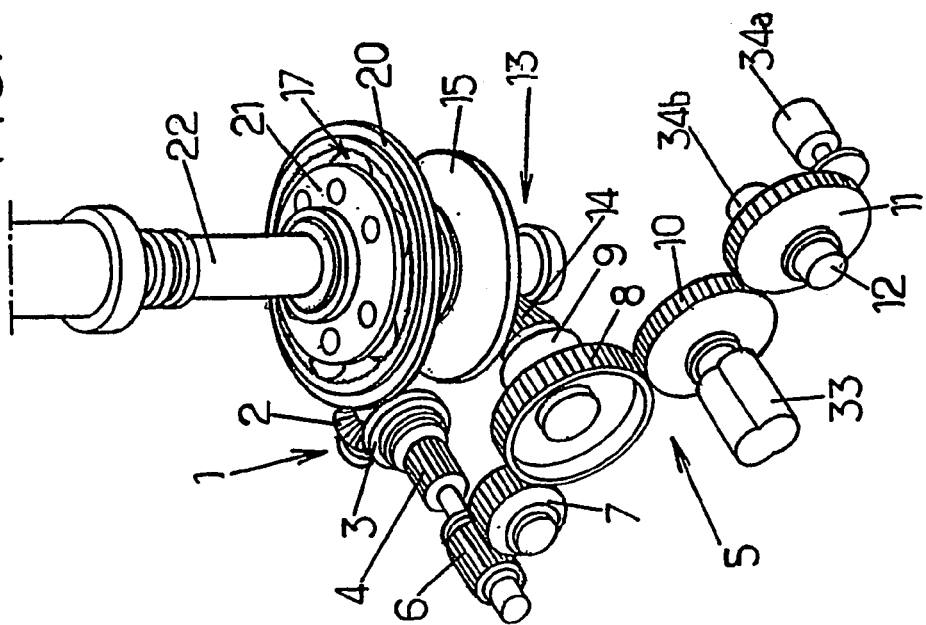

In FIGS. 1 to 7, the drive transmission to ensure the rotational driving of a rotor R (FIG. 1) about its axis of rotation A—A, starting from a turbomotor M (FIG. 1) that is fixed with respect to the convertible aircraft, schematized in C of FIG. 1, equipped with tilting rotor R that can tilt about a tilting axis B—B perpendicular to axis A—A, includes a fixed input module 1 with conical or spiral-conical couple, whose input bevel gear 2 is connected to an output shaft of the motor M, and whose toothed bevel output gear 3 is connected, by its shaft, and through a free wheel gear 4 (FIG. 2) to a fixed side module 5 comprising a train of cylindrical gears represented in FIGS. 2 and 3.

Downstream from input module high speed reducing unit stage 1, side module 5 includes a first intermediate reducing stage made up of a pinion 6, driven by the output shaft of free wheel 4, meshing with a pinion 7 itself meshing in a second intermediate reducing stage, with a pinion 8 known as the "tilting" pinion because it is driven in rotation with its shaft 9 about the B—B tilting axis of a tilting reducing unit as described below.

Tilting pinion 8 also meshes with an intermediate pinion 10 itself meshing with an interconnection pinion 11 with the drive shaft, partially depicted in 12 to drive another rotor in rotation from motor M, when the drive rotor of the other rotor has failed, or to drive rotor R from the drive motor of the other rotor, should motor M fail.

The cylindrical gear set 6, 7, 8, 10 and 11 of side module 5 forms a side gear set, with respect to the output shaft of motor M, and this side module 5 forms with the input module 1 a non-tilting transmission reducing unit, set up as an intermediate transmission box, connected by shaft 9 of tilting drive gear 8 to a transmission tilting reducing unit as described here.

This tilting reducing unit, arranged like a main helicopter transmission box, consists of a main module 13 comprising an input reducing stage of the conical or spiral-conical couple type, in which a tapered input gear 14 is coaxial with cylindrical tilting drive gear 8 and integral in rotation with this tilting drive gear in at least one direction of rotation, about tilting axis B—B. The main module 13 is therefore a tilting module with conical or spiral-conical couple, also including a taper toothed output gear 15, meshing with taper drive gear 14, and whose shaft 16 is guided in rotation about the A—A rotation axis of rotor R, and integral in rotation with a planet gear 18, of a output reducing stage of the epicyclical type or an epicyclical module 17, whose planet gear 18 meshes with satellite drive gears 19, also meshing with an outer peripheral ring gear 20, retained in rotation at the bottom of a tilting crankcase, as explained below, with satellite drive gears 19 each mounted to rotate about its shaft, on a satellite holder 21 integral in coaxial rotation with the mast 22 of rotor R about the A—A rotation axis.

The from tilting reducing unit consisting of main 13 and epicyclical modules 17, is housed in a tilting crankcase 23, consisting of a fond de crankcase 24 assembled to a crankcase top 25 having a profiled shape, converging on rotor R.

The base of rotor mast 22 is mounted and guided in rotation in the top of crankcase 25 by roller bearing 26 and a double taper roller race bearing 27, and is driven in rotation by axial ribs meshing with the axial ribs of a central bore of satellite 21 which, as shown in FIGS. 6 and 7, is housed in and mounted in rotation with the remainder of tilting power transmission box 13–17, in the bottom of crankcase 24, in which shaft 16 common to planet gear 18 and taper gear 15 is mounted and guided in rotation by a ball bearing 28 and two roller bearings 29 (FIG. 1).

The tilting crankcase 23 is mounted to swivel through its crankcase 24 bottom, about the B—B tilting axis (axis of taper drive gear 14, of tilting drive gear 8 and its shaft 9) on a rigid non-tilting support 30 (FIGS. 4 and 5), attached to the structure of the rear part of a corresponding drive cell and to the structure of a convertible aircraft fixed wing, as described in the aforementioned patents. This swiveling set up of crankcase 23 on support 30 is ensured by the trunnion-mounting of crankcase 24 bottom between the two fixed parts of pivot 31, made integral with support 30, by two plain bearings one of which is described below with reference to FIGS. 8 and 9.

The drive gears of side module 5 of the rigid non-tilting reducing unit are housed in a non-tilting side crankcase 32, also integral with the fixed part 31 and rigid support 30, as shown in FIGS. 6 and 7, also showing the arrangement of certain elements in the epicyclical module 17 in the bottom of crankcase 24, in which, in particular, outer gear ring 20 is retained.

For simplification, non-tilting crankcase 32 of side module 5 is not shown in FIG. 1, in which only tilting drive gear 8 and its shaft 9, belonging to this module, are depicted schematically, together with the fixed part 31 through which this shaft 9 passes, at the corresponding swiveling bearing. Note that the non-tilting side crankcase 32 also supports accessories driven by the drive gears of side module 5, especially a hydraulic pump 33 driven by intermediate gear 10, and two lubricating pumps 34a and 34b belonging to the lubricating installation described below, and driven from interconnecting drive gear 11 whereas intermediate gear 7 drives the shaft of a lubrication installation heat exchanger cooling fan and an alternator 35 is driven by the shaft of taper gear 3 of input module 1.

This pressurized lubricating installation, described here with reference to FIGS. 1 and 8 to 14, is necessary to lubricate the parts of tilting power transmission box 13–17 housed in tilting crankcase 23, and especially the drive gears and crown gears of basic module 13 and epicyclical module 17 together with their bearings and journals 26 to 29, and the driving ribs of rotor mast 22 through satellite holder 21.

This lubricating installation, schematically represented in FIG. 1, comprises a side tank 36 of liquid lubricant, integral with support 30 and with non-tilting side crankcase 32, and in which are housed the two lubricating pumps 34a and 34b, of which one 34a (FIG. 1) is part of a main lubricating circuit 37a, while the other lubricating pump 34b is part of a backup lubricating circuit 37b. Each lubricating pump 34a, 34b is for instance of the gear type pumping liquid lubricant into the bottom of tank 36, through filter 38a or 38b, being bypassed by an overpressure valve 39a or 39b to feed a pipe 40a or 40b. The supply pipe 40a of main circuit 37a opens into a filter 41 at the inlet of a heat exchanger 42 swept by a flow of air driven by a fan 43, driven in rotation through intermediate gear 7 of side module 5, to cool the liquid lubricant of main circuit 37a. The inlet of exchanger 42 is connected to its outlet by a branch pipe fitted with a calibrated valve 44, for cold starting the installation, and the main pipe 40a is split after the outlet from heat exchanger 42, into two branches, one being the lubricating pipe 45a of alternator 35, and the other a pipe 46a that is at least partially incorporated into fixed part 31 integral with support 30, and feeding a transfer bearing 47a for transferring pressurized liquid lubricant from fixed part 31 to inside tilting crankcase 23.

The supply duct 40b of emergency circuit 37b does not run through filter 41 and heat exchanger 42, and also splits into two branches, one 45b being a backup lubricating pipe for alternator 35, and the other a pipe 46b partially incorporated into fixed part 31 and feeding a second liquid lubricant transfer bearing 47b from the fixed part of the installation to the inside of tilting crankcase 23.

Beyond transfer bearing 47a or 47b the lubricating main circuit 37a or standby circuit 37b is extended by a distribution pipe 48a or 48b opening into tilting crankcase 23, in an annular distribution channel 49a or 49b, enclosing shaft 16 and more or less centered on the A—A rotation axis of rotor mast 22, in an annular distribution channel 49a and 49b feeding liquid lubricant to main lubrication pipes 50a or backup pipes 50b terminating on main 51a or backup 51b lubricant jets directed towards the devices to be lubricated such as the gears and pinions of basic module 13 and epicyclical module 17, and to bearings 26 to 29.

Note that the distribution channel 49b of emergency circuit 37b feeds a number of lubricating pipes 50b, and therefore of backup lubricating jets 51b, smaller than the number of lubricating pipes 50a and lubricating 51a of main circuit 37a, because emergency circuit 37b, in which the liquid lubricant is not cooled in heat exchanger 42, only provides backup lubrication for the critical points of tilting crankcase 23, in case of main circuit 37a failing. The two main 37a and backup 37b circuits operate normally and continuously and their lubricating pumps 34a and 34b are normally driven non-stop.

After its projection by jets 51a and/or 51b, the lubricant flows out by gravity, in particular along the inside walls of crankcase 23, and collects at the bottom of crankcase 23, which is the bottom of crankcase 24 when crankcase 23, and therefore the tilting power transmission box, is in helicopter mode, or that is the lowest part of the bottom of crankcase 24 and the top of crankcase 25 when the crankcase 23 assembly has tilted into aircraft mode (FIG. 5), in which case the liquid lubricant is collected and pressurized by a pump or Archimedean screw, as described below, to be channeled under pressure into part of the bottom of crankcase 24, to a drain channel 53 of a single drain circuit 52, ensuring the return of liquid lubricant from tilting crankcase 23 to tank 36, through fixed part 31, thanks to plain transfer bearing 54, between crankcase 23 and fixed part 31, communicating with a return pipe 55 integrated into fixed part 31 and opening out into tank 36.

The transfer bearings 47a and 47b of main 37a and backup 37b lubricating circuits have the same structure and are set up between portions facing two cylindrical journals 56 and 57, coaxial about tilting axis B—B and facing each other of which one 56 is a fixed journal arranged on fixed part 31 and turned radially to the outside, while being positioned radially on the inside of the other cylindrical journal 57, defined by a bore in a swiveling part 58 integral in rotation with tilting crankcase 23. Fixed part 31 and swiveling part 58 are respectively integral with a sleeve 59 and a trunnion 60 (see FIGS. 8 and 9) that are cylindrical with a circular section, coaxial about the B—B tilting axis, radially towards the outside of transfer bearings 47*a* and 47*b*, and such that trunnion 60 is tight fitted to swivel inside sleeve 59 with interposition of a shouldered wear ring 61 to form one of the two plain bearings of tilting crankcase 23 pivot on support 30, the other plain bearing being symmetrical with respect to axis of rotation A—A, with that 59-60-61 described above.

Each transfer bearing 47*a* or 47*b* for pressurized lubricant between two seals 62*a* and 63*a*, or 62*b* and 63*b* (see FIGS. 9, 9*a*, 9*b*, 9*c*) that are annular and each having a prone U-shape section, arranged between journals 56 and 57 so that each of the seals of the same journal 47*a* or 47*b* is open facing the other seal, that is, so that the concavity of each of seals 62*a*, 63*a* or 62*b*, 63*b* of each transfer bearing 47*a* or 47*b* is turned towards the other seal of the same journal. The two seals 62*a*, 63*a* or 62*b*, 63*b* are spaced away from each other in the direction of tilting axis B—B, and establish between one another and between journals 56 and 57 an annular chamber 64*a* or 64*b* for pressurized liquid lubricant whose pressure ensures the application of the side lips of each seal 62*a*, 63*a*, or 62*b*, 63*b*, radially towards the inside or outside, i.e. towards journal 56 or towards journal 57, and against the corresponding journal or, possibly, any device lining this journal 56 or 57.

A device like this may be shouldered ring such as 65 (see FIGS. 9, 9*a* and 9*b*), attached to one of the two journals 56 and 57, for instance, to fixed journal 56, so as to retain axially a seal, such as 62*a*, against the pressure in the corresponding annular chamber, such as 64*a*, which tends to spread apart two seals, such as 62*a* and 63*a* from one another, while the other seal such as 63*a* of the same transfer bearing such as 47*a* is also retained axially, either by another shouldered ring, or by at least one radial shoulder such as 66 or 67, arranged on one of journals 56 and 57, as shown in FIGS. 9*a* and 9*b* for instance.

Figure 12:
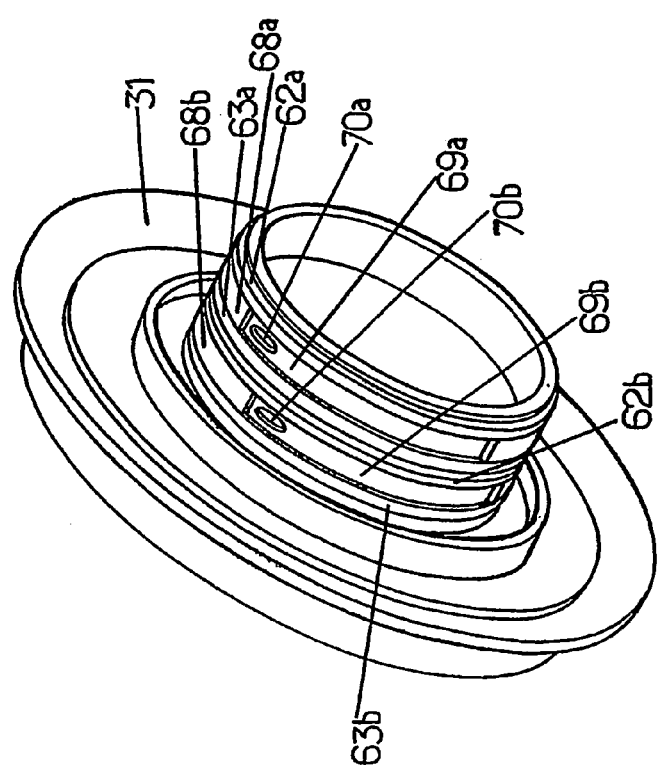

Another device may consist of journals 56 and 57, and against which one of the side lips of a seal may be applied tightly by the pressure prevailing in corresponding annular chamber 64*a*, 64*b* is a ring such as 68*a* or 68*b*, shown in FIG. 9, surrounding the portion of fixed journal 56 extending between the two seals 62*a* and 63*a* or 62*b* and 63*b*, and in which a hole 69*a* or 69*b* has been machined to form a circle arc, centered on the tilting axis B—B and under which lies by circle arc of about 110° corresponding more or less to the maximum tilting angle of tilting crankcase 23 on the non-tilting support 30. In each case, the holes 69*a* and 69*b*, that are offset with respect to one another not only along the B—B tilting axis but also circumferentially about the B—B tilting axis as shown in FIG. 12, a hole 70*a* or 70*b*, drilled into fixed journal 56 between two seals 52*a*, 53*a* or 52*b*, 53*b*, opens out, and through which hole 69*a* or 69*b* and corresponding annular chamber 64*a* or 64*b* are fed with liquid lubricant through the downstream end of supply duct 46*a* or 46*b* integrated into fixed part 31.

Each annular chamber 64*a* or 64*b*, supplied in this way with pressurized liquid lubricant, in turn feeds tilting crankcase 23 with pressurized liquid lubricant through an outlet hole 71*a* or 71*b*, opening into swiveling journal 57, between two seals 62*a*, 63*a* or 62*b*, 63*b* of the same transfer bearing 47*a* or 47*b*, and at the downstream end of corresponding distribution pipe 48*a* or 48*b*, extending into swiveling part 58.

At the downstream end, this distribution pipe 48*a* or 48*b* opens into the corresponding annular distribution channel 49*a* or 49*b*, with these two channels arranged for instance in the base of a diaphragm 72, more or less transversal inside the tilting crankcase 23, and supporting, in its central annular part, at least one bearing such as one of bearings 29 guiding shaft 16 of taper gear 15 and of planet gear 18 of a second reducing unit 13–17, or another bearing guiding for instance rotor mast 22.

In bearings 47*a* and 47*b*, which are also radial transfer bearings, with radial tightness (at the side lips of the seals) of the pressurized liquid lubricant transferred from fixed part 31 to swiveling part 58 with tilting crankcase 23, cylindrical rings having holes in a circle arc, such as rings 68*a*, 68*b* with holes 69*a*, 69*b*, may be included instead of or in addition to the latter, against swiveling journal 57 and so that outlet orifice 71*a* or 71*b* opens into the hole, which is always opposite, no matter what the tilting position of tilting crankcase 23, to an inlet hole 70*a* or 70*b* that may open directly into fixed journal 56. The presence of rings like 68*a*, 68*b* with a half circle hole such as 69*a* or 69*b* ensures a transfer flow of lubricant under pressure that is sufficient, whatever the position of tilting crankcase 23.

We also note, as shown in FIGS. 9*a* and 9*b*, that the fixed part 31, that is an annular part (see FIGS. 12 and 13) has a central bore through which passes the single input driving gear 14 of basic module 13, which gear 14 is mounted and guided in rotation in fixed part 31 by ball bearings 73 and roller bearings 74.

FIG. 9*c* shows a leak detector 75, such as a pressure sensor that may be installed in the portion of fixed journal 56 extending between seal 63*a* of transfer bearing 47*a* and seal 62*b* of the other transfer bearing 47*b*, which seals 63*a* and 62*b* form with the corresponding portions of fixed 56 and swiveling 57 journals a volume 76 in which any flows from these two seals 63*a* and 62*b* gather, and to which pressure sensor 75 is sensitive. This detector 75 may be incorporated into a monitoring circuit and detect leaks of the pressurized liquid lubricant between the two radial transfer seals 47*a* and 47*b*, but without being able to identify which of the two corresponding seals 63*a* or 62*b* is leaking when one of the two is defective.

Figure 11:
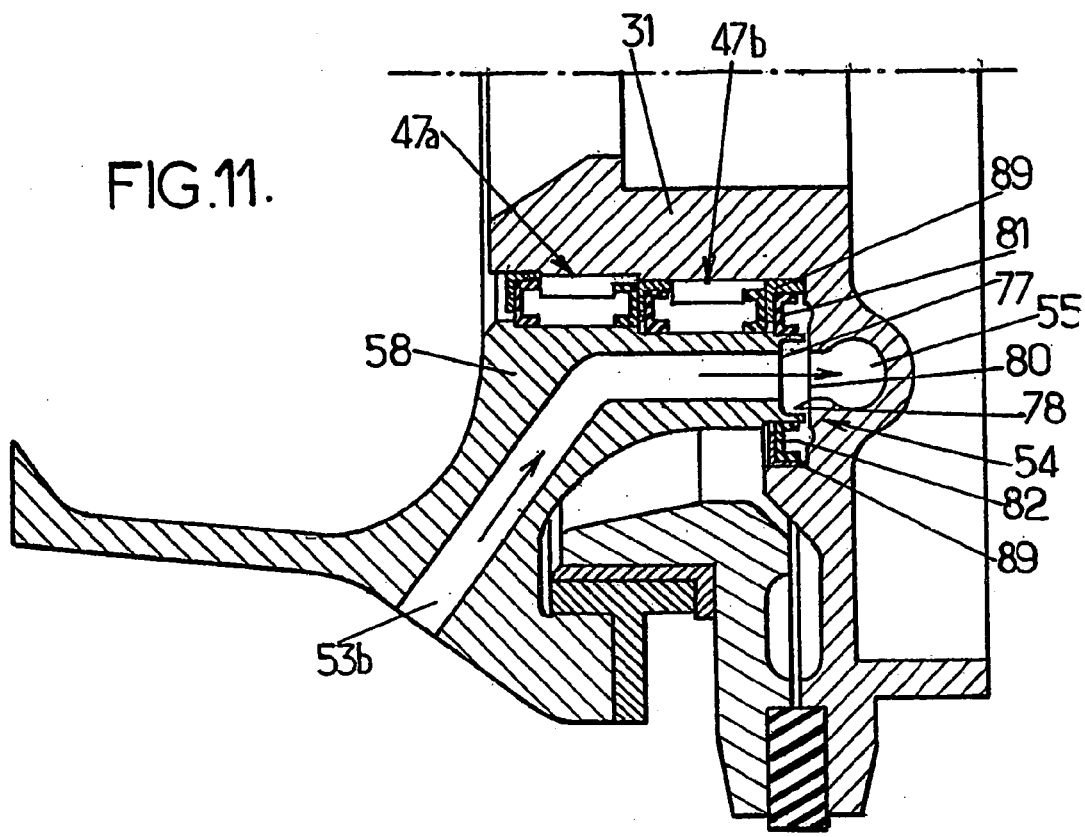
FIGS. 10 and 11 are views similar to FIG. 9 of details of FIG. 8 at the same swiveling journal of the crankcase and facial transfer journal of the drain circuit in crankcase tilt positions corresponding respectively to helicopter and aircraft modes rotor driven through the transmission.
Figure 10:
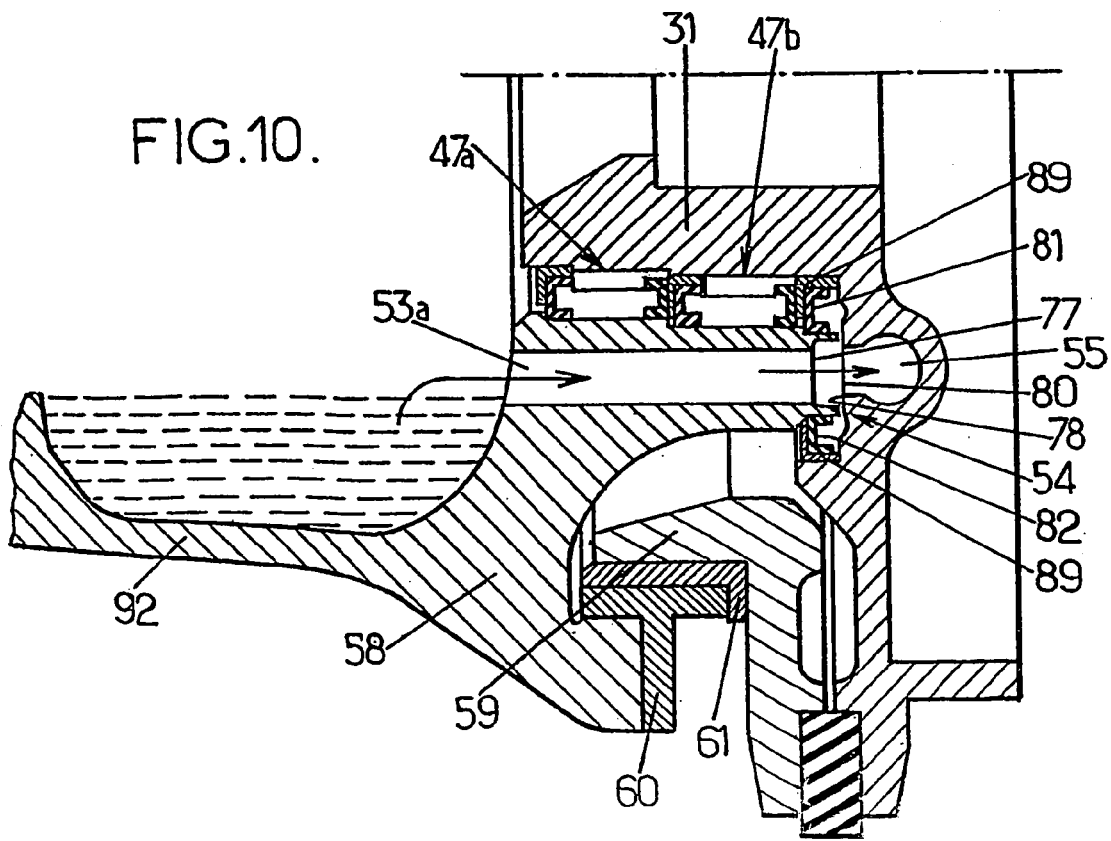
Figure 11A:
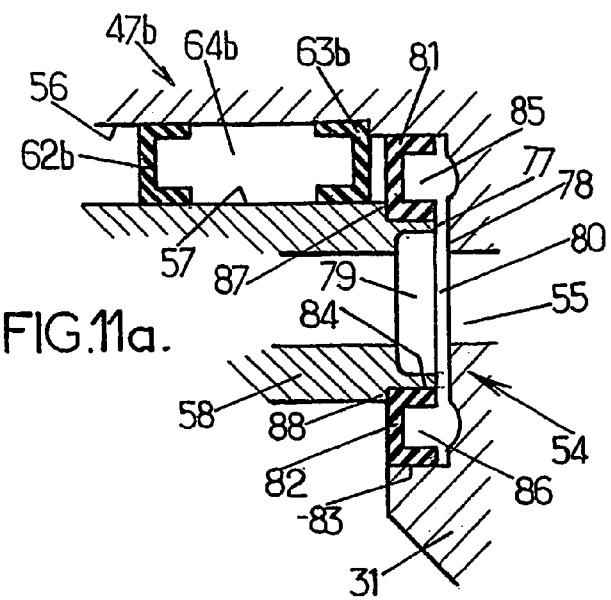
FIG. 11a is a schematic representation of an alternative of the facial transfer journal of FIGS. 10 and 11, the FIG. 11b is a schematic representation of a monitoring device leak detector between the facial transfer journal of the drain circuit and the radial transfer journal of a lubricating circuit.

As far as the sole drain circuit 52 (at the bottom of FIG. 8) is concerned, its transfer bearing 54 transferring lubricant from tilting crankcase 23 to return pipe 55 leading to tank 36, is a facial transfer bearing between two radial faces 77 and 78 (with respect to tilting axis B—B) that are annular faces more or less coaxial about tilting axis B—B and arranged vis-à-vis, one having a radial swiveling face 77 arranged on swiveling part 58, and the other having a fixed radial face 78 arranged on fixed part 31 (see FIGS. 10, 11 and 11*a*).

The schematic representation of FIG. 11*a* shows a facial opening 79 forming a circle arc centered on tilting axis B—B and extending into an angular sector of around 110° corresponding to the maximum tilting angle of tilting crankcase 23, arranged in the radial swiveling face 77 and fed with liquid lubricant gathered in the bottom crankcase 24 as described below. Whatever the position of the tilting crankcase 23, this facial hole 79 always faces a drain orifice 80 arranged in fixed radial face 78, at the upstream end of return pipe 55 integrated into fixed part 31 and leading to tank 36.

Figure 13:
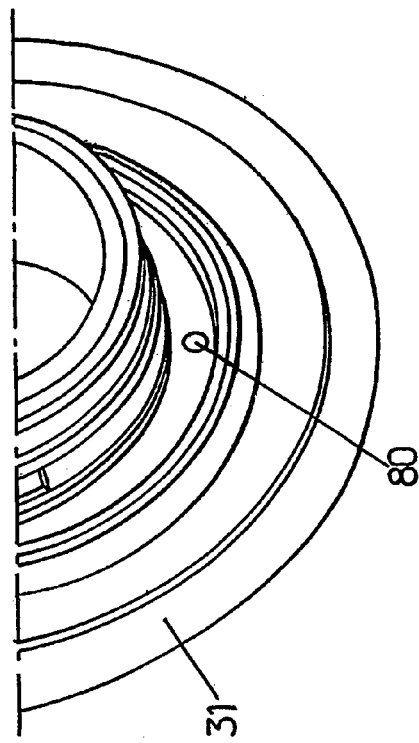
FIGS. 12 and 13 are perspective views of the fixed part in which the transfer journals are partially mounted the radial and facial lubricating circuit installation.

This drain hole 80, visible in FIG. 13, has a larger passage section than do inlet holes 70*a*, 70*b* or outlet holes 71*a*, 71*b* of radial transfer bearings 47*a*, 47*b* to ease the flow at a fast enough rate of recycled liquid lubricant back to tank 36, and so as not to create any significant load loss.

The facial transfer bearing 54 has radial sealing provided by two other annular seals 81 and 82, coaxial about tilting axis B—B and of the same type as the seals of the radial transfer bearings 47*a* and 47*b*, i.e. having a prone U-shaped transversal section, One of these seals, 81, extends radially into facial opening 79, and the other seal 82 extends radially into this opening 79. Each of seals 81 and 82 is arranged in such a way that its concave face is turned towards fixed part 31, and seal 81 is mounted between two portions radially facing one another of the two fixed coaxial cylindrical 56 and swiveling 57 journals, between which are mounted seals 62*a*, 63*a*, and 62*b*, 63*b* of each of the two radial transfer bearings 47*a* and 47*b*.

In a more or less similar manner, the other seal 82, in an extreme radial position is mounted between tow cylindrical journals 83 and 84, more or less coaxial about this tilting axis B—B, and one of which, 84, is a swiveling journal arranged on swiveling part 58 and limiting the radial swiveling face 77 radially towards the outside whereas the other cylindrical journal 63 is a fixed journal arranged on fixed part 31.

Accordingly, as represented schematically in FIG. 11*a*, each seal 81 and 82 defines with fixed part 31 an annular radial sealing chamber 85 or 86 in communication with facial opening 79 and drain hole 80 through the end clearance between the two radial faces 77 and 78, so that each chamber 85 or 86 is filled with lubricant liquid at sufficient pressure to apply each of the two side lips of each of seals 81 and 82 radially towards the inside or outside, against respectively one of the fixed cylindrical journals 56 or 83 or swiveling journals 57 or 84. This radial application of the lips of seals 81 and 82 against the cylindrical journals 56, 57 and 83, 84 under the effect of the pressure inside chambers 85 and 86 ensures good radial tightness at facial transfer bearing 54, the axial retention of seals 81 and 82 against the two corresponding cylindrical journals also being insured, as in the case of the seals of radial transfer bearings 47*a* and 47*b*, by radial shouldering such that 87 and 88 on the swiveling journals 57 and 84 in FIG. 11*a*, or by shouldered rings such 89 in FIGS. 10 and 11, with these shouldered rings 89 being similar to the ring 65 of FIG. 9*a* and also secured to fixed part 31.

Figure 11B:
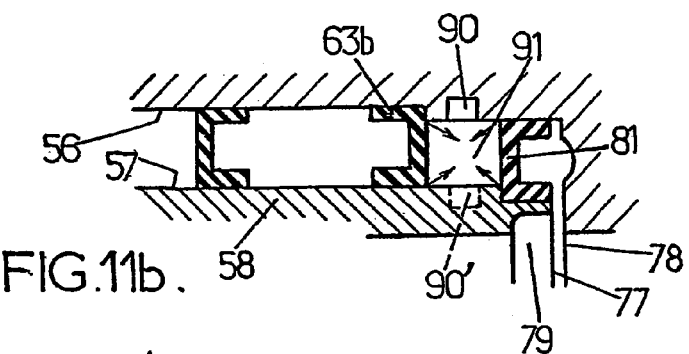

In the embodiment shown in FIG. 11*b*, in which the seals 81 and 63*b*, respectively of facial transfer bearing 54 and of radial transfer bearing 47*b*, not directly back to back or separated only by a shouldered ring, such as 89, axially retaining at least one of the seals, a leak detector 90, of the pressure sensor type, such as the leak detector 75 of FIG. 9*c*, can be installed in the portion of fixed journal 56 that extends between these two seals 81 and 63*b*, said detector 90 being sensitive to the presence of pressurized liquid lubricant in volume 91 formed between these two seals. As an alternative, the detector can be set up in 90' in the portion of swiveling journal 57 confining this volume 91 in the swiveling part 58.

The facial opening 79 of facial transfer bearing 54, described above as being fed by a drain channel 53 with liquid lubricant collected in the tilting crankcase 23 is in reality supplied by one and/or the other of two drain channels 53*a* and 53*b*, each of which is effective in respectively one of the two extreme swiveling positions of tilting axis 23 with respect to fixed support 30.

In the helicopter mode (FIG. 4), after the lubricant has been projected onto the lubricated parts in tilting crankcase 23 and collected by gravity, as shown in FIG. 10, in a collection tank 92 supported by swiveling part 58 in the bottom of crankcase 24, and the lubricant flows out by gravity and through drain channel 53*a* drilled into the swiveling part 58 until it opens out into facial opening 79, and therefore between the two radial faces 77 and 78 of this facial transfer bearing 54.

Conversely, in aircraft mode (FIG. 5) the liquid lubricant gathered in at least one bottom zone of crankcase 23 is pressurized by a pressurizing device which may be a drain pump driven in rotation in the bottom of crankcase 24 from one of the driving or gear wheels of the transmission housed in this 23, for instance, an auxiliary driving gear meshing with gear 15 and whose shaft directly or indirectly drives this drain pump. The liquid lubricant collected and pressurized in the bottom of crankcase 24 is then taken to the facial opening 79 through a second drain channel 53*b* provided in swiveling part 58, as shown schematically in FIG. 11.

As an alternative, the two drain pumps can be driven in the bottom of crankcase 24, and arranged so that one draws off lubricant when tilting crankcase 23 is in aircraft mode, and the other when crankcase 23 is in helicopter mode.

This or these drain pumps can also transfer the lubricant collected in the bottom of crankcase 24 to facial transfer bearing 54 via a suitable number of drains channels such as 53*a* and 53*b*.

Figure 14:
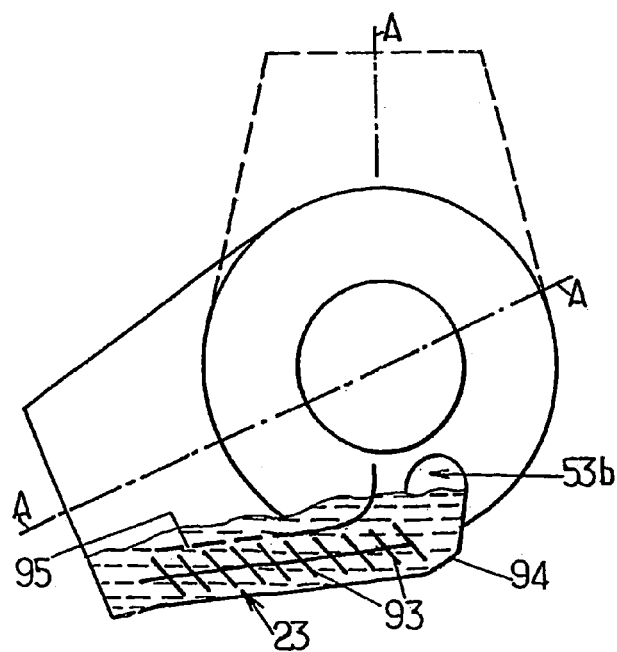
FIG. 14 is a schematic representation of the tilting crankcase in aircraft mode with an Archimedean screw in the drain and lubricating circuit.

But to remedy the drawbacks relating to the use of at least one drain pump in tilting crankcase 23, and as presented in FR 00 12154, the organ pressurizing the collected lubricant in the bottom of crankcase 24 in the aircraft mode is preferably, as proposed in the aforementioned French patent, an Archimedean screw, such as represented schematically in FIG. 14, corresponding more or less to the FIG. 1 of this French patent. This Archimedean screw 93 is driven in rotation by a movement taken off one of the driving gears of the gear wheel in tilting crankcase 23, in a channel 94 extending inside and along the wall of crankcase 23, and in particular appearing as a protrusion towards the outside of the bottom of crankcase 24, in a direction contained within a plane, passing through the axis of rotation A—A, and in the lowest part of the bottom of crankcase 24 when crankcase 23 has tilted into aircraft mode. This channel 94 protruding partially towards the outside of the bottom of crankcase 24 is shown in FIGS. 4, 6 and 7 too. The inside of this channel 94 communicates through various openings 95, arranged at different levels over the length of channel 94, with the inside of crankcase 23, in order to collect the liquid lubricant flowing into tilted crankcase 23. The collected lubricant is impelled by Archimedean screw 93, under sufficient pressure up to the inlet of the second drain channel 53*b*, in a transfer zone designed to allow the feeding of facial opening 79 and the facial transfer seal 54 with liquid lubricant recovered in crankcase 23 in aircraft mode.

In this way, a lubricating installation is obtained whose mass and dimensions are reduced, offering high reliability and simplified maintenance.

The invention claimed is:

1. A lubrication installation for a tilting power box (13–17), intended to rotate at least a driven body (22) driven about an axis of rotation (A—A) that is itself designed to swivel about a tilting axis (B—B), more or less perpendicular to said axis of rotation (A—A) of said driven body (22), said power box including a tilting crankcase (23) mounted to tilt about said tilting axis (B—B) on a non-tilting rigid support (30), the installation comprising:

at least one lubricating circuit (37*a*, 37*b*) under pressure for at least one device to be lubricated that is housed in the tilting crankcase (23), said lubricating circuit comprising a radial transfer stage (47*a*, 47*b*) for liquid lubricant under pressure, between two cylindrical journals (56, 57) facing each other, approximately coaxial about the tilting axis (B—B), and of which one is a fixed journal (56) arranged on a fixed part (31) integral with said non-tilting support (30), and the other is a swiveling journal (57) mounted on a swiveling part (58) integral with the tilting crankcase (23), said radial transfer stage (47*a*, 47*b*) comprising two annular seals (62*a*, 63*a*, 62*b* and 63*b*) having a prone U-shaped cross-section, with the concavity of each turned to face the other and spaced from one another along the tilting axis (B—B), so that an annular chamber (64*a*, 64*b*) of pressurized liquid lubricant is contained between said two annular seals (62*a*, 63*a*, 62*b* and 63*b*) and the two journals (56, 57), said annular chamber (64*a*, 64*b*) being fed with liquid lubricant under pressure by an inlet hole (70*a*, 70*b*) emerging in the fixed journal (56) between said two annular seals (62*a*, 63*a*, 62*b* and 63*b*) and with the downstream end of at least one supply duct (46*e*, 46*b*) integrated into said fixed part (31) and whose upstream end is connected to at least one source (34*a*, 34*b*) of pressurized lubricant, and also, feeding the tilting crankcase (23) in liquid lubricant under pressure through an outlet hole (71*a*, 71*b*) emerging in the swiveling journal (57) between said two annular seals (62*a*, 63*a*, 62*b* and 63*b*) and at the upstream end at least one distribution pipe (48*a*, 48*b*) extending into the swiveling part (58) and emerging in the tilting crankcase (23).

2. An installation according to claim 1, wherein at least one said inlet hole (70*a*, 70*b*) and outlet hole (71*a*, 71*b*) opens into an area (69*a*, 69*b*) forming a circular arc centered on the tilting axis (B—B), arranged between the two annular seals (62*a*, 63*a*; 62*b*, 63*b*) in corresponding said fixed journal (56) and said swiveling journal (57) with the angle of said circular arc corresponding to a swiveling arc of said tilting crankcase.

3. An installation according to claim 1, wherein each of the two annular seals (62*a*, 63*a*, 62*b*, 63*b*) is retained axially between said two journals (56, 57) and against the pressure in said annular chamber (64*a*, 64*b*) by a radial shoulder (66, 67) arranged on one of said two journals (56, 57) or by a shouldered ring (65) attached to one of the two journals (56, 57).

4. An installation according to claim 1, further comprising a drain circuit (52), ensuring the return of the liquid lubricant from the tilting crankcase (23) into the fixed part (31) through a facial transfer bearing (54) for the liquid lubricant between two radial faces (77, 78), with respect to the tilting axis (B—B), and of which one is a swiveling radial face (77) arranged on said swiveling part (58) and the other is a fixed radial face (78), arranged in said fixed part (31), at least one drain channel (53*a*, 53*b*), arranged in said swiveling part (58), opening into a facial opening (79) forming a circle arc centered on the tilting axis (B—B) and arranged in said swiveling radial face (77), opposite a drain orifice (80) opening into said fixed radial face (78) and the upstream end of a return pipe (55) integrated into said fixed part (31) to conduct the liquid lubricant into a tank (36).

5. An installation according to claim 4, wherein said facial opening (79) extends into said swiveling radial face (77) between two other annular seals (81, 82), more or less coaxial around said tilting axis (B—B) and situated radially one (82) on the outside and the other (81) on the inside of said radial opening (79), each of the two other seals (81, 82) having a prone transversal U-shaped concave face turned towards said fixed part (31) and being mounted between said two cylindrical journals (56, 57; 83, 84) more or less coaxial about the tilting axis (B—B) and of which one is a swiveling journal (57, 84) arranged on said swiveling part (58), and the other a fixed journal (56, 83) arranged on said fixed part (31), so that each said other seal (81, 82) delimit with said fixed part (31) an annular chamber (85, 86) offering radial sealing and communicating between the two radial faces (77, 78), with the facial opening (79) and drain hole (80), and filled with liquid lubricant.

6. An installation according to claim 5, further comprising at least one leak detector (90, 90'), sensitive to the presence of liquid lubricant in a volume (91) formed between a first seal (81) associated with the facial transfer journal (54) and a second seal (63*b*) on the radial transfer journal (47*b*) of a lubricating circuit (27*b*), the first and second seals (81, 63*b*) being mounted between the cylindrical journals (56, 57).

7. An installation according to claim 4, wherein the drain circuit (52) includes a first drain channel (53*a*), emerging downstream into said facial opening (79), and, upstream, into a bottom (24) of said tilting crankcase (23) in which the liquid lubricant is collected by gravity in at least a first position of said tilting crankcase (23) about the tilting axis (B—B), and a second drain channel (53*b*), emerging into said facial opening (79) by its downstream end and channeling pressurized liquid lubricant through at least one pressurization stage (93) for the lubricant collected in at least one part of said tilting crankcase (23), in at least a second position of the tilting crankcase (23) about the tilting axis (B—B).

8. An installation according to claim 7, wherein said at least one pressurization stage (93) is a drain pump, driven in rotation in part of said tilting crankcase (23) in which the liquid lubricant is collected in at least said second position of tilting crankcase (23) about said tilting axis (B—B), said drain pump feeding the second drain channel (53*b*).

9. An installation according to claim 7, wherein said at least one pressurization stage (93) is an Archimedean screw, driven in rotation in a chute (94) extending inside and along a wall of said tilting crankcase (23), said chute (94) being drilled with holes (95) to collect the liquid lubricant at various levels in said tilting crankcase (23), in at least said second position of the latter about the tilting axis (B—B), said Archimedean screw feeding second drain channel (53*b*).

10. An installation according to claim 1, comprising two of said lubricating circuits, including a main circuit (37*a*) and an emergency circuit (37*b*), arranged so that their radial transfer journals (47*a*, 47*b*), have much the same radius about the tilting axis (B—B), and are offset with respect to one another about the tilting axis (B—B), and in a circumferential direction about the tilting axis (B—B) for their inlet (70*a*, 70*b*) and outlet (71*a*, 71*b*) openings and, if necessary, their arc of a circle opening (69*a*, 69*b*), and the draining (52) of the lubricant is ensured by a drain circuit common to both said lubricating circuits (37*a*, 37*b*).

11. An installation according to claim 10, further comprising at least one leak detector (75), sensitive to the presence of pressurized liquid lubricant (47*a*, 47*b*) in the volume formed between the radial transfer bearings of the two lubricating circuits (37*a*, 37*b*), said radial transfer bearings (47*a*, 47*b*) being axially offset between these fixed (56) and swiveling (57) cylindrical journals.

12. An installation according to claim 10, further comprising at least one supply duct (46*a*, 46*b*) that is integrated into said fixed part (31) of each of said lubricating circuits (37*a*, 37*b*) and is fed from a tank (36) of liquid lubricant in which at least one lubricating pump (34*a*, 34*b*) is immersed for each said lubricating circuit (37*a*, 37*b*).

13. An installation according to claim 12, wherein each said lubricating pump (34a, 34b) is driven by a driving gear (11) of a first reducing unit (1–5) housed at least partly in a non-tilting crankcase (32) integral with said support (30), said first reducing unit (1–5) meshing through a driving gear (8) mounted to rotate about said tilting axis (B—B), with a second reducing unit (13–17) housed in said tilting crankcase (23) and swiveling with it.

14. An installation according to claim 1, wherein said lubricating circuit (37a, 37b) comprises at least one annular distribution channel (49a, 49b), approximately centered on said axis of rotation (A—A) of the driven device (22) and connected to said annular chamber (64a, 64b) of the corresponding said radial transfer stage (47a, 47b) by said distribution pipe (48a, 48b).

15. An installation according to claim 14, wherein said annular distribution channel (49a, 49b) is arranged within a diaphragm (72) more or less transversal with respect to said tilting crankcase (23) and supporting similarly a guide roller (29) of at least one shaft (16) of at least one driving gear (15, 18) of the power box (13–17) and/or said driven device (22) driving in rotation, each said annular distribution channel (49a, 49b) feeding liquid lubricant to lubricating pipes (50a, 50b) ending in lubricating jets (51a, 51b) turned towards the devices to be lubricated.

16. A convertible aircraft comprising said lubricating installation according to claim 1.

17. An installation according to claim 2, wherein each of the two seals (62a, 63a, 62b, 63b) is retained axially between two journals (56, 57) and against the pressure in said annular chamber (64a, 64b) by a radial shoulder (66, 67) arranged on one of two journals (56, 57) or by a shouldered ring (65) attached to one of the two journals (56, 57).

* * * * *